United States Patent Office 3,330,623
Patented July 11, 1967

3,330,623
MANUFACTURE OF ANTIMONY TRIOXIDE
Walter Edward Green, Greenford, Middlesex, England, assignor to Associated Lead Manufacturers Limited, London, England, a British company
No Drawing. Filed Nov. 1, 1963, Ser. No. 320,830
Claims priority, application Great Britain, Nov. 15, 1962, 43,302/62; Mar. 15, 1963, 10,440/63
8 Claims. (Cl. 23—144)

ABSTRACT OF THE DISCLOSURE

Antimony trioxide of 10–20 microns in size is provided by heating antimony trioxide of 1–2 microns in size under substantially non-oxidizing conditions.

Antimony trioxide has long been used as a pigment and, as such, opacity of the substance is desirable. As commercially manufactured and sold this product normally has a particle size of the order of 1 to 2 microns.

More recently, antimony trioxide has come into use as an ingredient of flame proofing compositions, but it is often undesirable to incorporate in plastic compositions antimony trioxide of high opacity. A typical example is a roof light, which may be rendered insufficiently transparent.

The incorporation of opaque antimony trioxide in coloured plastic articles also has a modifying effect on the colour.

The present invention provides, as a new article of manufacture, antimony trioxide which has a particle size of the order of 10–20 microns and which accordingly has a low opacity.

According to the invention this new product may be manufactured by heating commercially available antimony trioxide of fine particle size of the order of 1 to 2 microns to a temperature in the range of 400–570° C. under conditions in which runaway oxidation is prevented. When the material is so heated, it forms into larger particles, probably as the result of vapour phase recrystallization. Thus the material having an initial particle size of the order of 1–2 microns is converted into a product having a particle size of the order of 10–20 microns.

When antimony trioxide is heated in air to a temperature in the above range it tends to oxidize to a higher oxide and, unless precautions are taken, the reaction, which is exothermic, runs away and the product sinters. This, however, can be prevented by heating the antimony trioxide in an inert atmosphere, e.g. of nitrogen, or by heating it in air and mechanically disturbing it, e.g. by tumbling or stirring. Such mechanical disturbance is found to result in very little tendency of the material to oxidize.

A convenient method of carrying out the process according to the invention on an industrial scale is to heat the antimony trioxide in a closed container and it has been found that mechanical disturbance of the material and the use of an inert atmosphere are then unnecessary. When the container is full of the powdered oxide, about half of the internal volume of the container will be occupied by air. The oxygen present in this air is absorbed by the powdered material and converts a small amount of it to a higher oxide of antimony. The great bulk of the antimony trioxide remains unchanged and is converted into the coarse particulate material of particle size 10–20 microns.

The following three examples show the effect on the staining resistance of antimony trioxide obtained by heating it in accordance with the invention. In these examples staining resistance is compared by the amount of a standard coloured pigment required to be added to the antimony trioxide to tint it to a determined shade.

Example A

Antimony trioxide heated in nitrogen at 450° C.

| Hours | Staining resistance, percent |
|---|---|
| 0 | 100 |
| 2½ | 63 |
| 6 | 56 |
| 16 | 49 |
| 23 | 34 |
| 46 | 17 |

Example B

Antimony trioxide heated in nitrogen at 520° C.

| Hours | Staining resistance, percent |
|---|---|
| 0 | 100 |
| 1 | 63 |
| 2 | 50 |
| 4½ | 37 |
| 7½ | 27 |
| 16 | 17 |
| 24 | 14 |

Example C

Antimony trioxide heated in air with stirring at 520° C.

| Hours | Staining resistance, percent |
|---|---|
| 0 | 100 |
| 4 | 62 |
| 9½ | 45 |
| 14½ | 33 |
| 21½ | 25 |

The low opacity antimony trioxide according to the invention is of particular utility as a flameproofing ingredient in thermoplastic synthetic resins and the invention includes such resins which have been rendered flame-resistant by incorporation therein of antimony trioxide of low opacity and having a particle size of the order of 10–20 microns, together with a suitable chlorine containing compound, such for example as a chlorinated paraffin or a chlorinated diphenyl.

Typical examples of such synthetic resins are as follows:

Example 1

| | Parts by weight |
|---|---|
| Polyester resin | 100 |
| Cereclor 70 (chlorinated hydrocarbon) | 15 |
| $Sb_2O_3$ | 15 |

Example 2

| | Parts by weight |
|---|---|
| Polyethylene | 300 |
| Chlorinated paraffin (70% Cl) | 46 |
| $Sb_2O_3$ | 46 |
| Calcium stearate | 5 |
| Tricresyl phosphate | 3 |

Example 3

| | Parts by weight |
|---|---|
| Clear polystyrene | 20 |
| Chlorinated paraffin (70% Cl) | 4 |
| $Sb_2O_3$ | 2 |

Example 4

| | Parts by weight |
|---|---|
| Cellulose propionate | 65 |
| Chlorinated paraffin (70% Cl) | 15 |
| $Sb_2O_3$ | 15 |

Example 5

| | Parts by weight |
|---|---|
| Cellulose acetate butyrate | 20 |
| Chlorinated paraffin (70% Cl) | 3 |
| $Sb_2O_3$ | 4 |

Example 6

| | Parts by weight |
|---|---|
| Polyterpene resin | 70 |
| Chlorinated paraffin (70% Cl) | 15 |
| $Sb_2O_3$ | 15 |

Example 7

| | Parts by weight |
|---|---|
| Styrene butadiene copolymer G.R.–S | 70 |
| Chlorinated paraffin (70% Cl) | 15 |
| $Sb_2O_3$ | 15 |

Example 8

| | Parts by weight |
|---|---|
| Polypropylene | 100 |
| Cereclor 70 | 15 |
| $Sb_2O_3$ | 15 |

Where it is desired to colour such flame-retardant resins far less colouring matter is required to attain a given tint when the low opacity $Sb_2O_3$ of 10–20 micron particle size is used than is required when the conventional more finely divided $Sb_2O_3$ is used. Moreover, colours may be produced of a strength unattainable with conventional $Sb_2O_3$ which, due to its high opacity, imparts a chalky appearance to the resin.

In a particular instance, two batches of a resin of the composition set out in Example 2 were made up, the first containing low opacity $Sb_2O_3$ and the second containing conventional high opacity $Sb_2O_3$. The first required the addition of 54 parts by weight of a standard blue master batch to attain a given colour. The second required the addition of no less than 390 parts by weight of the same blue master batch to attain the same colour.

What I claim as my invention and desire to secure by Letters Patent is:

1. Antimony trioxide of low opacity and having a particle size of the order of 10–20 microns comprising vapor phase recrystallized antimony trioxide of 1–2 microns in particle size, said antimony trioxide being prepared by the process of claim 2.

2. A process which comprises heating commercially available antimony trioxide, having a particle size of the order of 1–2 microns, to a temperature in the range of 400–570° C. under substantially non-oxidizing conditions for a time sufficient to vapor phase recrystallize low opacity particles having a size in the range of 10–20 microns.

3. A process as claimed in claim 2, wherein the antimony trioxide is heated in an inert atmosphere.

4. A process as claimed in claim 2, wherein the antimony trioxide is heated in air while subjecting the same to mechanical agitation.

5. A process as claimed in claim 2, wherein the antimony trioxide is heated in a closed container.

6. A process as claimed in claim 3, in which the inert atmosphere is of nitrogen.

7. A process as claimed in claim 4, in which the antimony oxide is mechanically agitated by tumbling.

8. A process as claimed in claim 4, in which the antimony oxide is mechanically agitated by stirring.

References Cited

UNITED STATES PATENTS

| | | | |
|---|---|---|---|
| 1,504,685 | 8/1924 | Germot | 23—144 |
| 2,136,793 | 11/1938 | Gabeler et al. | 23—313 X |
| 2,258,441 | 10/1941 | Bozarth | 23—144 |
| 2,350,638 | 6/1944 | Podschus et al. | 23—144 |
| 2,590,211 | 3/1952 | Rugar et al. | |
| 2,635,950 | 4/1953 | Robinson | 23—313 |
| 2,909,501 | 10/1959 | Robitschek et al. | |
| 3,048,478 | 8/1962 | Smith | 23—313 |
| 3,096,155 | 7/1963 | Gordon | 23—144 |

OSCAR R. VERTIZ, *Primary Examiner.*

LEON J. BERCOVITZ, *Examiner.*

G. W. RAUCHFUSS, B. H. LEVENSON,
*Assistant Examiners.*